United States Patent Office 3,502,749
Patented Mar. 24, 1970

3,502,749
PROCESS FOR PRODUCTION OF ORGANO-PHOSPHORUS COMPOUNDS FROM WHITE PHOSPHORUS AND MONO EPOXY CONTAINING COMPOUNDS
Sasson Goren, Kaf-Zayin St. 10, Kiriat Haim; Dagobert Kellerman, 88a Derekh Hayam; and Dahlia S. Greidinger, 98 Hatishbi St., all of Haifa, Israel
No Drawing. Filed June 15, 1966, Ser. No. 557,614
Claims priority, application Great Britain, June 16, 1965, 25,555/65
Int. Cl. C07f 9/28, 9/08; C10l 1/26
U.S. Cl. 260—971                          1 Claim

ABSTRACT OF THE DISCLOSURE

Organo-phosphorus compounds having an average ratio of epoxide residue to phosphorus of 1.5 or more to 1 wherein some of the phosphorus atoms are linked directly to carbon and some provided by way of ester linkages are produced by a one-step reaction of an epoxy compound such as epichlorhydrin, styrene oxide or butylene oxide with white phosphorus and oxygen in a solvent such as ethyl acetate. These compounds are useful as surface active agents, emulsifiers, lubricants and motor fuel additives, and flame proofing agents for plastics.

---

In U.S. patent application Ser. No. 509,612 filed on Nov. 24, 1965, which is a continuation-in-part of U.S. patent application Ser. No. 251,734, now abandoned, there is described and claimed a process for the production of organo phosphorus compounds comprising mainly esters of phosphorus acids of an average oxidation state of phosphorus of from about 3.9 to about 4.1, which process comprises reacting white phosphorus, an organic compound having at least one hydroxy group and oxygen supplied as a stream of air in a non-aqueous reaction system at a temperature in the range from about 20° C. to about 55° C. until substantially all the phosphorus has reacted. The compositions of matter obtained according to this process correspond statistically to the composition of dialkyl dihydrogen hypophosphate as regards the oxidation state of phosphorus, the acid number and the ratio of phosphorus to alkyl groups. The reaction is carried out according to a preferred embodiment of the reaction in a system comprising an inert solvent, which will not undergo chemical changes during the reaction and in which the organic reactants and products as well as the oxygen and phosphorus are at least slightly soluble. When the reaction is effected in such inert solvents it proceeds at higher speeds of reaction than without solvent and can be effected in a much safer manner.

According to the present invention there is provided a novel process for the production of organo phosphorus compounds which are both novel and useful. The products obtained according to the process of the present invention can be used as surface active agents, as emulsifiers, as additives to lubricants and to motor fuels, for the flame-proofing of plastics etc. Due to the simplicity of the process, which converts elementary phosphorus in a one-step-reaction into organo phosphorus compounds, the products can be advantageously used as intermediates for the preparation of a wide variety of compounds.

The process according to the present invention comprises reacting white phosphorus, oxygen provided in a stream of air and an organic compound containing at least one terminal epoxide group of the type

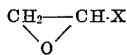

where X is a member of the group consisting of phenyl, alkyl and haloalkyl, in the presence of an inert solvent, at a temperature in the range of from about 0° C. to about 70° C., until substantially all the elementary phosphorus has reacted and been converted into the desired product of reaction. The process can be carried out without such inert solvent, but the preferred embodiment of carrying out the process is in the presence of such solvent. It is possible to carry out the process in an excess of the hydrocarbon reactant, which is only partially used in the reaction, whereas the excess fulfils the task of the solvent.

As inert solvent there may be used non-aqueous solvents for both the epoxy compounds and products of the reaction, and in which white phosphorus and oxygen are at least slightly soluble. Lower alkyl esters, such as ethyl acetate or butyl acetate are satisfactory solvents. Ethyl acetate is preferred because its relatively low cost and as its lower boiling point facilitates its removal at the termination of the reaction.

The reaction according to the invention is exothermic. The rate of reaction is advantageously controlled by the control of the rate of introduction of air. In some cases the rate of reaction is controlled by the application of external cooling. The preferred range of temperatures for the reaction according to the present invention is about up to a temperature of 50° C.

The products of the reaction are colorless, pale, odorless and more or less viscous liquids. These react with water and with alcohol, yielding, respectively products of hydrolysis and of alcoholysis. The products of reaction are readily soluble in organic solvents, such as acetone, toluene, chloroform and butyl acetate. The stoichiometry of the products of reaction is such that the main constituent has an overall ratio of epoxide residue to phosphorus of 1.5 or more to 1. The main products of the reaction contain in addition to the ordinary ester linkages for the phosphorus also a considerable part of the phosphorus bound directly to carbon.

In the following the invention will be described with reference to a number of examples. It is to be clearly understood that these are to be construed in an illustrative and not in a limitative manner. It is also stressed that the present invention is by no means restricted to the specific epoxides exemplified, as these are only given as examples.

EXAMPLE 1

A reaction vessel was equipped with an efficient stirrer, a thermometer, an inlet tube for air and an outlet tube. A condensor was provided which could be used for containing a Dry Ice-acetone mixture.

Into the reaction vessel there was introduced 300 g. epichlorhydrin and 8 g. white phosphorus which was dispersed into a fine dispersion by melting and letting solidify by cooling under vigorous stirring. Air was introduced at a rate of 50 liters per hour. An exothermic reaction took place with the evolution of dense white fumes. The temperature was maintained between 40 and 45° C. by external cooling. The reaction was continued for a total time of 2 hours, after which period of time no more elementary phosphorus remained in the reaction mixture. The excess of epichlorhydrin was distilled off at reduced pressure and there was obtained 69 g. of a very pale yellow, odorless, viscous liquid. It contained 10.8 percent phosphorus and 29.5 percent chlorine. Its molecular weight, determined by freezing point depression in benzene was found to be 478. On complete hydrolysis the phosphorus was found to be present as follows: as phosphoric acid 15.1 percent; as phorphorous acid 24.5 percent and the remainder in the form of carbon-phosphorus linkages. The product of reaction was readily soluble in acetone, chloroform and butyl acetate.

EXAMPLE 2

A vessel as described in Example 1 was charged with 150 g. butyl acetate, 40 g. epichlorhydrin and 4.5 g. finely dispersed white phosphorus. Air was introduced at a rate of 50 liters per hour during 90 minutes. A vigorous exothermic reaction took place, producing dense white fumes. The temperature was maintained at 40–45° C. by external cooling. At the end of this period no elementary phosphorus remained.

The solvent was distilled off at reduced pressure. The product was obtained as a colorless viscous liquid weighing 27.3 g., containing 11.8 percent phosphorus.

EXAMPLE 3

A vessel as described in Example 1 was charged with 150 g. styrene oxide and 3.3 g. finely dispersed white phosphorus. Air was passed through at a rate of 50 liters per hour. A vigorous exothermic reaction took place, producing dense white fumes. The reaction took only 45 minutes, and at the end of this time no elementary phosphorus remained in the reaction mixture. The temperature was maintained during the reaction period at 40–45° C. by external cooling. The excess of styrene oxide was removed by distilling off at reduced pressure, There was obtained 55 g. of a very pale brown very viscous liquid containing 5.1 percent phosphorus. Its molecular weight, determined cryoscopically, was 417.

EXAMPLE 4

A reaction vessel as described in Example 1 was charged with 150 ml. ethyl acetate, 24 g. styrene oxide and 3.6 g. white phosphorus, finely dispersed as set out in Example 1. Air was passed through at a rate of 40 liters per hour. A vigorous reaction took place, producing dense white fumes. The temperature was maintained at 45–50° C. by external cooling. After 1 hour the reaction was terminated as no more elementary white phosphorus remained. The solvent was distilled off at a high vacuum and there was obtained 33.5 g. of a pale yellow very viscous liquid containing 9.9 percent phosphorus.

EXAMPLE 5

A reaction vessel as described in Example 1 was charged with 200 g. butylene oxide and 4.8 g. finely dispersed white phosphorus. Air was passed through at a rate of 30 liters per hour. An exothermic reaction took place, producing dense white fumes. During the reaction the temperature was maintained at 40–45° C. by external cooling. After 3 hours no elementary phosphorus remained in the reaction mixture. The excess of butylene oxide was distilled off under vacuum. There was obtained 65 g. of a colorless viscous liquid which had a molecular weight, determined cryoscopically, of 364. It contained 6.6 percent phosphorus. The product dissolves readily in acetone, ether, carbon tetrachloride, chloroform and butyl acetate.

EXAMPLE 6

A vessel, as described in Example 1, was charged with 200 ml. butyl acetate, 50 g. butylene oxide and 4.7 g. finely dispersed white phosphorus. Air was passed through at a rate of 40 liters per hour. An exothermic reaction took place, producing dense white fumes. The temperature was maintained at 40–45° C. by external cooling. After 2 hours no phosphorus remained. Excess of the solvent and excess of the butyl oxide were distilled off under reduced pressure. There were obtained 31.5 g. of a colorless slightly viscous liquid, containing 13.6 percent phosphorus. Its molecular weight, determined cryoscopically, was 533.

EXAMPLE 7

A vessel as described in Example 1 was charged with 270 ml. dry butyl acetate, 34.5 g. epichlorhydrin and 7.7 g. white phosphorus. The mixture was heated to 50° C. and air was passed through at a rate of 50 liters per hour, while the temperature was maintained at 48–52° C. At first a vigorous exothermic reaction took place, producing dense white fumes. After the reaction became more moderate, the temperature was maintained by heating. After 4 and a half hours no elementary phosphorus remained. The solvent was removed by evaporation. About 31.5 g. of a light yellow viscous liquid was obtained, containing 13.6 percent of phosphorus and 20.4 percent chlorine. The molecular weight of the product, determined cryoscopically, was 524. In this example the ratio of epoxy groups to P is 1.5 to 1.

We claim:
1. A process for the production of organo phosphorus compounds having an average ratio of epoxide residue to phosphorus of 1.5 or more to 1, which comprises reacting a compound selected from the group consisting of epichlorhydrin, styrene oxide and butylene oxide, with white phosphorus and oxygen supplied as a stream of air in a lower alkyl ester solvent, at a temperature of from 0° C. to 70° C., until substantially all the phosphorus has undergone reaction.

References Cited

UNITED STATES PATENTS

| | | | |
|---|---|---|---|
| 2,568,784 | 9/1951 | Woodstock | 260—980 XR |
| 3,167,577 | 1/1965 | Malone | 260—980 XR |

CHARLES B. PARKER, Primary Examiner

ANTON H. SUTTO, Assistant Examiner

U.S. Cl. X.R.

44—76; 252—49.8, 135, 358; 260—45.7, 606.5, 920, 926, 980